UNITED STATES PATENT OFFICE 2,053,818

AZO-DYESTUFFS AND PROCESS OF MAKING SAME

Friedrich Felix and Wilhelm Huber, Basel, Switzerland, assignors to the firm of Society of Chemical Industry in Basle, Basel, Switzerland No Drawing. Original application March 21, 1935, Serial No. 12,299. Divided and this application October 15, 1935, Serial No. 45,163. In Switzerland March 24, 1934

9 Claims. (Cl. 260—92)

This being a division of our application for patent Ser. No. 12,299, filed in the U. S. A. on March 21, 1935, and in Switzerland on March 24, 1934, of which the following is a full, clear and exact specification.

This invention relates to the manufacture of dyestuffs by coupling a diazotized aromatic amine of the general formula

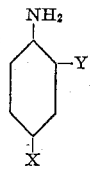

in which Y stands for a sulfone radical of the general formula $SO_2$—$CH_2$—R wherein R represents H, alkyl or phenyl, and X stands for a nitrogenous group which is linked with its nitrogen atom to the organic radical, such as a $NO_2$-group, an

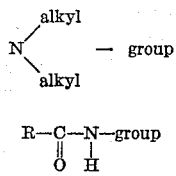

(R representing hydrogen, alkyl, aralkyl or aryl), e. g. an acidylamino-group, such as an acetylamino- or benzoylamino-group, with a coupling component of the general formula

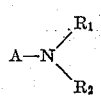

in which A stands for an unsulfonated nucleus of the naphthalene series which may or may not be substituted, and $R_1$ and $R_2$ each stand for hydrogen, alkyl, aryl or aralkyl radicals, the conditions of coupling being chosen in such a manner that the

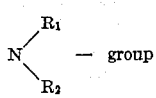

is the group which causes coupling.

The term "alkyl radicals" comprises not only the radicals of hydrocarbons, such as methyl, ethyl, propyl or butyl radicals, and the like, but also, as used in the scientific literature, cf. "Anthracene and Anthraquinone" by E. de Barry Barnett, London 1921, page 207, and in the Patent literature cf. British Patent 26,336/1910, claim 1, substituted alkyl radicals, for example, alkyl radicals substituted by halogen, such as, for example, chloro-, bromo- or iodo-ethyl radicals, alkyl radicals substituted by OH-groups, such as hydroxyethyl-, hydroxypropyl-, hydroxybutyl- or dihydroxy-propylene radicals, further the ethers and esters thereof, such as methoxyethyl- or acetoxyethyl- or ethylsulfuric acid radicals, further also alkylcarboxylic acid radicals and their derivatives, such as propionic acid radicals or propionic ester radicals or propionic acid amide radicals, or the radicals of ethylnitrile or ethylsulfocyanide. The aryl- or aralkyl- radicals $R_1$ and $R_2$ may also be substituted in the aromatic nucleus.

As products of the general formula

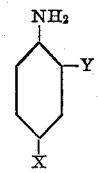

there may be named, for instance, 1-amino-4-nitrobenzene-2-methyl- (or 2-ethyl- or 2-benzyl- or 2-hydroxyethyl- or 2-hydroxybenzyl- or 2-carboxymethyl- or carboxymethylester-methyl)-sulfone, the corresponding 1-amino-4-nitro-5-chlorobenzene-2-alkylsulfone, the corresponding 1-amino-4-nitro-6-chlorobenzene-2-alkylsulfone, the corresponding sulfones in which the chlorine is exchanged for bromine or iodine, and 1-amino-4,6-dinitrobenzene-2-methylsulfone, further the 1-amino-4-acetylaminophenyl-2-methylsulfone, the 1-amino-4-acetylaminophenyl-2-ethylsulfone, the 1-amino-5-chloro-4-acetylaminophenyl-2-methylsulfone, the 1-amino-4-benzylamino-phenyl-2-methylsulfone, the 1-amino-4-(4'-methoxy)-benzoylaminophenyl-2-methylsulfone, the 1-amino-4-(4'-chloro)-benzylaminophenyl-2-methylsulfone, the 1-amino-4-benzoylaminophenyl-2-ethylsulfone, the 1-amino-4-benzylaminophenol-2-benzylsulfone, the 1-amino-4-phenoxy-acetylaminophenyl-2-methylsulfone, the 1-amino-4-(4'-ethoxy)-phenoxyacetylaminophenyl-2-methylsulfone, 1-amino-4-(2'-methyl)-phenoxyacetyl-aminophenyl-2-ethylsulfone, the 1-amino-4-phenyl-acetylaminophenyl-2-methylsulfone, the 1-amino-4-dimethylaminophenyl-2-ethylsulfone, the 1-amino-4-diethylaminophenyl-2-ethylsulfone, and the like.

As coupling components of the general formula

also explained above, there are suitable any unsulfonated bases of the naphthalene series capable of coupling, such as α- and β-naphthylamine, 1-amino-2-methoxynaphthalene or 1-amino-2-ethoxy-naphthalene such as

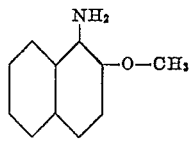

N-methyl-α-naphthylamine, N-ethyl-α-naphthylamine, N-methyl-β-naphthylamine, N-ethyl-β-naphthylamine, the so-called ω-methane-sulfonic acids of α- and β-naphthylamine, 1-N-methoxyethylamino-naphthalene of the formula

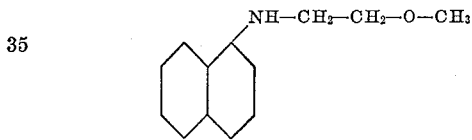

2-N-methoxyethylaminonaphthalene, 1-N-hydroxyethylaminonaphthalene, 2-N-hydroxyethylaminonaphthalene, further aminonaphthols such as, for example, 1-amino-5-hydroxynaphthalene, 1-amino-6-hydroxynaphthalene, 1-amino-7-hydroxynaphthalene, 1-amino-8-hydroxynaphthalene, 2-amino-3-hydroxynaphthalene, 2-amino-4-hydroxynaphthalene, 2-amino-5-hydroxynaphthalene, 2-amino-6-hydroxynaphthalene, 2-amino-7-hydroxynaphthalene, 2-amino-8-hydroxynaphthalene, further the corresponding alkylamino-hydroxynaphthalenes such as, for example, 1-methylamino-5-hydroxynaphthalene, 1-hydroxyethylamino-5-hydroxynaphthalene and the like.

If the coupling component of the general formula

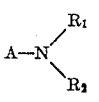

contains no phenolic OH-group in the aromatic nucleus A of the naphthalene series, the expression "coupling conditions in which the amino group

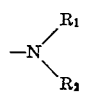

causes coupling" means the coupling of the component in neutral or acid medium usual for aromatic amines. However, if the aromatic nucleus A contains one or more phenolic OH-groups, coupling should be carried out in an acid medium. But, as is well known, the selection of the coupling conditions in such a manner that the amino group of a coupling component is the group which causes coupling does not present a problem to the expert, but a known measure.

The dyestuffs thus produced can be converted into other valuable products by treating them with suitable reducing agents so that the nitro-group of the diazo-component is reduced, and if desired, either acylating or alkylating the new amino-group by means of the usual agents, or converting the reduced body into other dyestuffs by diazotizing the amino-group and coupling with suitable coupling components.

The new dyestuffs correspond therefore to the general formula

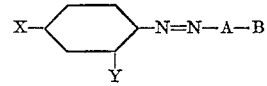

in which X stands for a nitrogenous group which is linked with its nitrogen atom to the aromatic nucleus, such as an $NO_2$-group, an $NH_2$-group, an

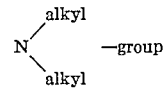

an

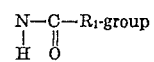

($R_1$ representing hydrogen, alkyl, aralkyl or aryl) i. e. an acetylamino or benzoylamino-group, a phenylacetylamino- or phenoxyacetylamino-group, Y stands for a sulfone radical of the general formula $SO_2$—$CH_2$—R (R representing H, alkyl or aryl), A for an unsulfonated aromatic nucleus of the naphthalene series, and B for an amino-group

wherein R stands for H, alkyl or aralkyl, which amino-group stands in 2- or 4-position to the —N=N—group.

The dyestuffs thus obtained are red to green powders, which are excellently suitable for dyeing textiles such as artificial silk or esters and ethers of cellulose, for example acetylcellulose and other conversion products of cellulose, such as nitro-cellulose, etc. The dyestuffs are also suitable for dyeing lacquers, varnishes and plastic masses, particularly nitrocellulose and phenolformaldehyde lacquers. They dye these products the same tints as the textiles. They can be used as intermediate products for the manufacture of further dyestuffs.

The above mentioned azo-dyestuffs are dark powders insoluble in water, but dissolving in acetic ester to red violet to blue and green solutions, and dyeing acetate artificial silk from suspension dye-baths red, violet to blue and green tints.

These non-sulfonated dyestuffs, which are sparingly soluble in water, are used for dyeing acetate artificial silk, preferably in finely dispersed form produced by grinding them with dispersing agents, for instance the sulfonated residues from the manufacture of benzaldehyde or turpentine oil and the like, in the presence of water until a fine paste is produced; or they may be converted in the presence of further quantities of the aforesaid or other auxiliary substances, such as sulfite cellulose waste liquor, by cautiously drying them in a vacuum at a temperature which is not too high, into dry preparations capable of being powdered.

The following examples illustrate the invention, the parts being by weight:—

Example 1

A mineral acid diazo-solution, made from 21.6 parts of 2-amino-5-nitro-phenylmethylsulfone is coupled with a solution of 19.5 parts of 5-hydroxy-1-aminonaphthalene-hydrochloride in water. The mixture is stirred until the coupling is complete. The dyestuff thus obtained is filtered and washed until neutral. When dry it is a dark powder soluble in acetone, ethyl acetate or the like to a greenish-blue solution. In suitable dispersion it dyes acetate artificial silk greenish-blue tints which can be discharged white. The dyestuff corresponds with the formula

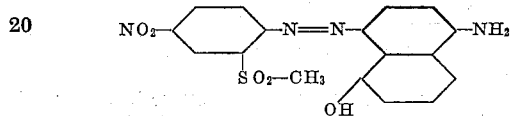

The dyestuff from the 2-amino-8-hydroxynaphthalene dyes acetate artificial silk or nitrocellulose varnishes violet tints; blue tints are obtained from the 1,5- or 1,8-diaminonaphthalene, further from the 1-amino-5-acetylaminonaphthalene.

In the following table there are listed some other dyestuffs obtainable in accordance with this invention:—

| | Diazo-component | Coupling-component | Color of the solution in ethyl acetate | Dyeing on acetate artificial silk |
|---|---|---|---|---|
| 1. | 2 - amino - 5 - nitro - phenylmethylsulfone | 1-methylamino - 5 - hydroxynaphthalene | Green | Green |
| 2. | ___do___ | 1 - allylamino - 5 - hydroxynaphthalene | ___do___ | Blue-green |
| 3. | ___do___ | 1 - hydroxyethylamino - 5 - hydroxynaphthalene | Blue-green | Do. |
| 4. | 2 - amino - 5 - nitro - 6 - chlorophenylmethyl - sulfone | 1 - amino-5-hydroxy - naphthalene | Blue | Blue |

The formulae of characteristic products of the table are the following:—

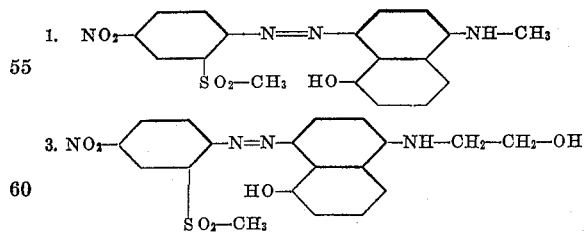

What we claim is:—

1. Process for the manufacture of azo-dyestuffs, consisting in coupling a diazotized amine of the general formula

in which Y stands for a sulfone radical of the formula $SO_2$—$CH_2$—R, R standing for a member of the group consisting of hydrogen, alkyl and aryl, and X stands for a nitrogenous group selected from the group consisting of the nitro group, acyl-amino groups and dialkyl-amino groups and which is linked with its nitrogen atom to the aromatic nucleus, with mono-amines capable of coupling corresponding to the general formula A—B in which A stands for an unsulfonated aromatic nucleus of the naphthalene series, and B stands for such an amino group which enables the radical A to combine with diazo-compounds to form azo-compounds, the coupling being carried out in an acid medium.

2. Process for the manufacture of azo-dyestuffs, consisting in coupling a diazotized amine of the general formula

in which Y stands for a sulfone radical of the formula $SO_2$—$CH_2$—R, R standing for a member of the group consisting of hydrogen, alkyl and aryl, and X stands for a nitrogenous group selected from the group consisting of the nitro group, acyl-amino groups and dialkyl-amino groups and which is linked with its nitrogen atom to the aromatic nucleus, with unsulfonated mono-amino-monohydroxynaphthalenes, the coupling being carried out in an acid medium.

3. Process for the manufacture of azo-dyestuffs, consisting in coupling a diazotized amine of the general formula

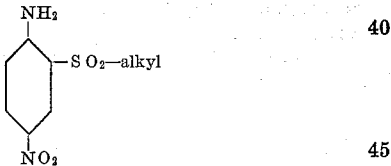

with unsulfonated amino-naphthols of the general formula

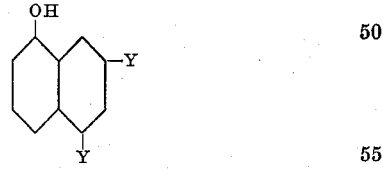

in which one Y stands for an $NH_2$-group and the other Y for a hydrogen atom, the coupling being carried out in an acid medium.

4. Process for the manufacture of azo-dyestuffs, consisting in coupling a diazotized amine of the general formula

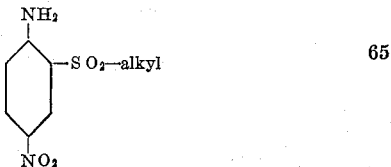

in which the alkyl radical contains at most 2 carbon atoms, with the unsulfonated 1-amino-5-hydroxynaphthalene, the coupling being carried out in an acid medium.

5. Process for the manufacture of an azo-dyestuff, consisting in coupling the diazotized amino-compound of the formula

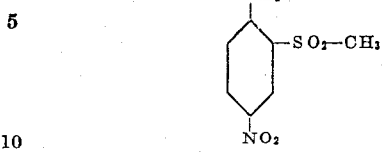

with the unsulfonated 1-amino-5-hydroxynaphthalene, the coupling being carried out in an acid medium.

6. The azo-dyestuffs of the general formula

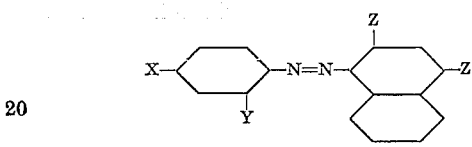

in which X stands for a nitrogenous group selected from the group consisting of the nitro group, acyl-amino groups and dialkyl-amino groups and which is linked with its nitrogen atom to the aromatic nucleus, Y for a sulfone radical of the general formula $SO_2$—$CH_2$—R, R standing for a member of the group consisting of hydrogen, alkyl and aryl, in which formula further the aromatic radical of the naphthalene series is not sulfonated and does not contain more than one phenolic OH-group, one Z stands for hydrogen and the other Z for an amino-group, the naphthalene nucleus carrying no other substituent than the amino-group Z and the phenolic OH-group, which products are dark powders soluble in pyridine to red, violet, blue and green solutions and dyeing lacquers and the fiber red to blue and green tints.

7. The unsulfonated azo-dyestuffs of the general formula

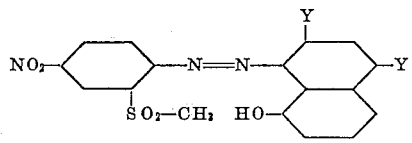

in which one Y stands for an $NH_2$-group and the other Y for a hydrogen atom, which products are dark powders insoluble in water, but soluble in acetic ester to violet to blue solutions and dyeing acetate artificial silk from a dye-bath containing these products in fine suspension violet to blue tints.

8. The unsulfonated azo-dyestuff of the formula

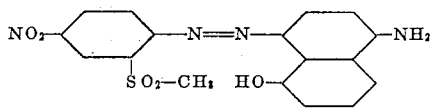

which product is a dark powder insoluble in water, but soluble in acetic ester to a blue solution and dyeing acetate artificial silk from a bath containing this dyestuff in fine suspension intensive pure blue tints.

9. The unsulfonated azo-dyestuff of the formula

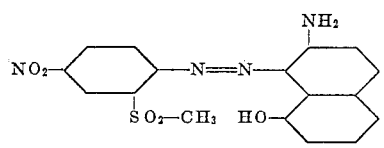

which product is a dark powder insoluble in water, but soluble in acetic ester to a violet solution and dyeing lacquers violet-blue tints.

FRIEDRICH FELIX.
WILHELM HUBER.